United States Patent
Liao et al.

(10) Patent No.: US 8,421,707 B2
(45) Date of Patent: Apr. 16, 2013

(54) PORTABLE ELECTRONIC DEVICE

(75) Inventors: Hung-Kai Liao, Taipei Hsien (TW); Chia-Hua Yang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 458 days.

(21) Appl. No.: 12/767,119

(22) Filed: Apr. 26, 2010

(65) Prior Publication Data

US 2010/0289763 A1 Nov. 18, 2010

(30) Foreign Application Priority Data

May 15, 2009 (TW) ................................ 98116164 A (51) Int. Cl.
*G09G 5/00* (2006.01)

(52) U.S. Cl.
USPC .............................. 345/1.1; 345/1.3; 345/173

(58) Field of Classification Search ............ 345/1.1–1.3, 345/3.1, 173–179
See application file for complete search history.

(56) References Cited

U.S. PATENT DOCUMENTS

| | | | | |
|---|---|---|---|---|
| 6,670,950 B1 * | 12/2003 | Chin et al. | ..................... | 345/173 |
| 7,054,965 B2 * | 5/2006 | Bell et al. | ......................... | 710/72 |
| 7,148,877 B2 * | 12/2006 | Chang et al. | ................... | 345/156 |
| 7,292,206 B2 * | 11/2007 | Numano | ........................ | 345/1.1 |
| 7,486,279 B2 * | 2/2009 | Wong et al. | .................... | 345/173 |
| 7,779,462 B2 * | 8/2010 | Mathew et al. | .................. | 726/17 |
| 2002/0130836 A1 * | 9/2002 | Ohmori et al. | ................. | 345/156 |
| 2004/0027338 A1 * | 2/2004 | Lampson | ....................... | 345/173 |
| 2005/0017957 A1 * | 1/2005 | Yi | ................................... | 345/173 |
| 2005/0122318 A1 * | 6/2005 | Tonouchi et al. | ............. | 345/179 |
| 2006/0071915 A1 * | 4/2006 | Rehm | ............................. | 345/173 |
| 2006/0274052 A1 * | 12/2006 | Lo et al. | ......................... | 345/173 |
| 2007/0070048 A1 * | 3/2007 | Aoyagi | ............................ | 345/173 |
| 2008/0309640 A1 * | 12/2008 | Hong | ............................ | 345/173 |
| 2009/0322683 A1 * | 12/2009 | Tsuji et al. | .................... | 345/168 |
| 2009/0322791 A1 * | 12/2009 | Wu | ................................ | 345/660 |
| 2010/0053092 A1 * | 3/2010 | Chen et al. | .................... | 345/173 |

* cited by examiner

*Primary Examiner* — Christopher E Leiby
(74) *Attorney, Agent, or Firm* — Rajesh Vallabh; Foley Hoag LLP (57) ABSTRACT

A portable electronic device includes: a computing device body including a main housing, a computing device disposed in the main housing, a keyboard and a touch control display disposed on the main housing and connected electrically to the computing device; a display screen body including a display housing and a flat panel display disposed on the display housing and connected electrically to the computing device; and a two-dimensional hinge connecting pivotally the display housing to the main housing such that the display screen body is pivotable relative to the main housing. The computing device is configured to output image signals to the touch control display and the flat panel display, respectively, the image signals being generated based on user operation of at least one of the touch control display and the keyboard and being output simultaneously to the touch control display and the flat panel display.

11 Claims, 7 Drawing Sheets

PORTABLE ELECTRONIC DEVICE

CROSS-REFERENCE TO RELATED APPLICATION

This application claims priority of Taiwanese application no. 098116164, filed on May 15, 2009.

BACKGROUND OF THE INVENTION

1. Field of the Invention

This invention relates to a portable electronic device, more particularly to a portable electronic device having two displays.

2. Description of the Related Art

Notebook computers have become essential tools for traveling businessmen. The businessman often needs to use the notebook computer for briefing a client, displaying merchandise to the client, or delivering a presentation. However, since a conventional notebook computer has only one flat panel display mounted on a display screen body, and the businessman himself needs to view content displayed on the flat panel display during the presentation, the flat panel display is typically turned toward the businessman rather than toward the client, and the client is often unable to view the displayed content clearly.

Moreover, a senior user often has difficulty using a keyboard and touchpad of the notebook computer for input operations. Further, not every user can become accustomed to using the touchpad, and many users would prefer to use a mouse rather than the touchpad. As such, it is desired to implement a touch control display to one side of the keyboard of the notebook computer that provides the user with an easily viewed display on which input operations can be intuitively and conveniently performed, and thereby assists the senior user in using the notebook computer.

SUMMARY OF THE INVENTION

Therefore, an object of the present invention is to provide a portable electronic device having two displays that enables a user and viewer to view display content simultaneously, and enables a user to perform input operations easily.

According to the present invention, there is provided a portable electronic device comprising a computing device body, a display screen body, and a two-dimensional hinge. The computing device body includes a main housing having an upper surface, a computing device disposed in the main housing, a keyboard disposed on the upper surface of the main housing and connected electrically to the computing device, and a touch control display disposed on the upper surface of the main housing and connected electrically to the computing device. The display screen body includes a display housing, and a flat panel display disposed on a side of the display housing and connected electrically to the computing device. The two-dimensional hinge connects pivotally the display housing to one side of the main housing such that the display screen body is pivotable forward, rearward, leftward, and rightward relative to the main housing.

The computing device is configured to output image signals to the touch control display and the flat panel display, respectively, the image signals being generated based on user operation of at least one of the touch control display and the keyboard and being output simultaneously to the touch control display and the flat panel display.

The computing device includes: a video signal memory, a central processing unit, a video signal processing unit, a signal controller, and a control unit. The central processing unit is coupled to the video signal memory for providing video signal data to the video signal memory for storage in the video signal memory. The video signal processing unit is coupled to the video signal memory, the touch control display and the flat panel display for accessing the video signal data from the video signal memory and outputting the image signals to the touch control display and the flat panel display. The signal controller is connected electrically to the touch control display for receiving a touch control signal from the touch control display. The control unit is coupled to the signal controller and the central processing unit for sending the touch control signal to the central processing unit, thus enabling the central processing unit to generate the video signal data in accordance with the touch control signal for subsequent output to the video signal memory.

The control unit includes: a northbridge controller connected electrically to the central processing unit; and a southbridge controller connected electrically to the northbridge controller and the signal controller for receiving the touch control signal from the signal controller and sending the touch control signal to the central processing unit through the northbridge controller.

Preferably, the keyboard includes a hot key for generating a first hot key signal when pressed. The first hot key signal is transmitted to the signal controller so as to cause the signal controller to disable a touch control function of the touch control display. When pressed again, the hot key generates a second hot key signal. The second hot key signal is transmitted to the signal controller so as to cause the signal controller to enable the touch control function of the touch control display.

Preferably, the flat panel display has touch control functionality, and the portable electronic device further comprises a pivot detecting component connected electrically to the signal controller. When the pivot detecting component detects that the display screen body is pivoted so as to form an angle greater than a predetermined value with respect to the main housing, the pivot detecting component generates a first detection signal that is transmitted to the central processing unit. In response to the first detection signal, the central processing unit outputs a disable signal for disabling the touch control functionality of the flat panel display. On the other hand, when the pivot detecting component detects that the display screen body is pivoted so as to form an angle that is less than the predetermined value with respect to the main housing, the pivot detecting component generates a second detection signal that is transmitted to the central processing unit. In response to the second detection signal, the central processing unit outputs an enable signal for enabling the touch control functionality of the flat panel display.

Preferably, the video signal memory stores full-screen video signal data therein. The video signal processing unit accesses the full-screen video from the video signal memory and is operable to output a same image signal to both the touch control display and the flat panel display based on the full-screen video signal data.

Preferably, when the video signal processing unit receives a scaling control command from the central processing unit, the video signal processing unit performs an appropriate scaling process on the full-screen video signal data according to the scaling control command to produce scaled video signal data, and outputs an image signal corresponding to the full-screen video signal data to the touch control display and another image signal corresponding to the scaled video signal data to the flat panel display.

Preferably, the video signal memory includes a first memory area for storing the full-screen video signal data, and a second memory area for storing scaled video signal data that is generated by the central processing unit when the central processing unit receives a scaling control command. In accordance with the scaling control command, the central processing unit accesses the full-screen video signal data from the first memory area, performs an appropriate scaling process on the full-screen video signal data to produce the scaled video signal data, and instructs the video signal processing unit to access the full-screen video signal data from the first memory area and output an image signal corresponding to the full-screen video signal data to the touch control display, and to access the scaled video signal data from the second memory area and output another image signal corresponding to the scaled video signal data to the flat panel display.

The portable electronic device of the present invention implements a touch control display adjacent to the keyboard of the computing device body, and a two-dimensional hinge connecting pivotally the display housing to one side of the main housing of the computing device body that allows the display screen body to pivot relative to the computing device body. When the display screen body is pivoted such that the flat panel display faces away from a user toward a viewer, the user can still view the content displayed on the flat panel display through the touch control display on the computing device body, and can perform touch control operations through the touch control display. Moreover, through operation of the touch control display and the hot keys of the keyboard, the scaling control command can be issued to the computing device for performing an appropriate scaling process on the display content displayed on the flat panel display. The present invention thus provides flexibility and convenience with respect to performing input operations and displaying content to the viewer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
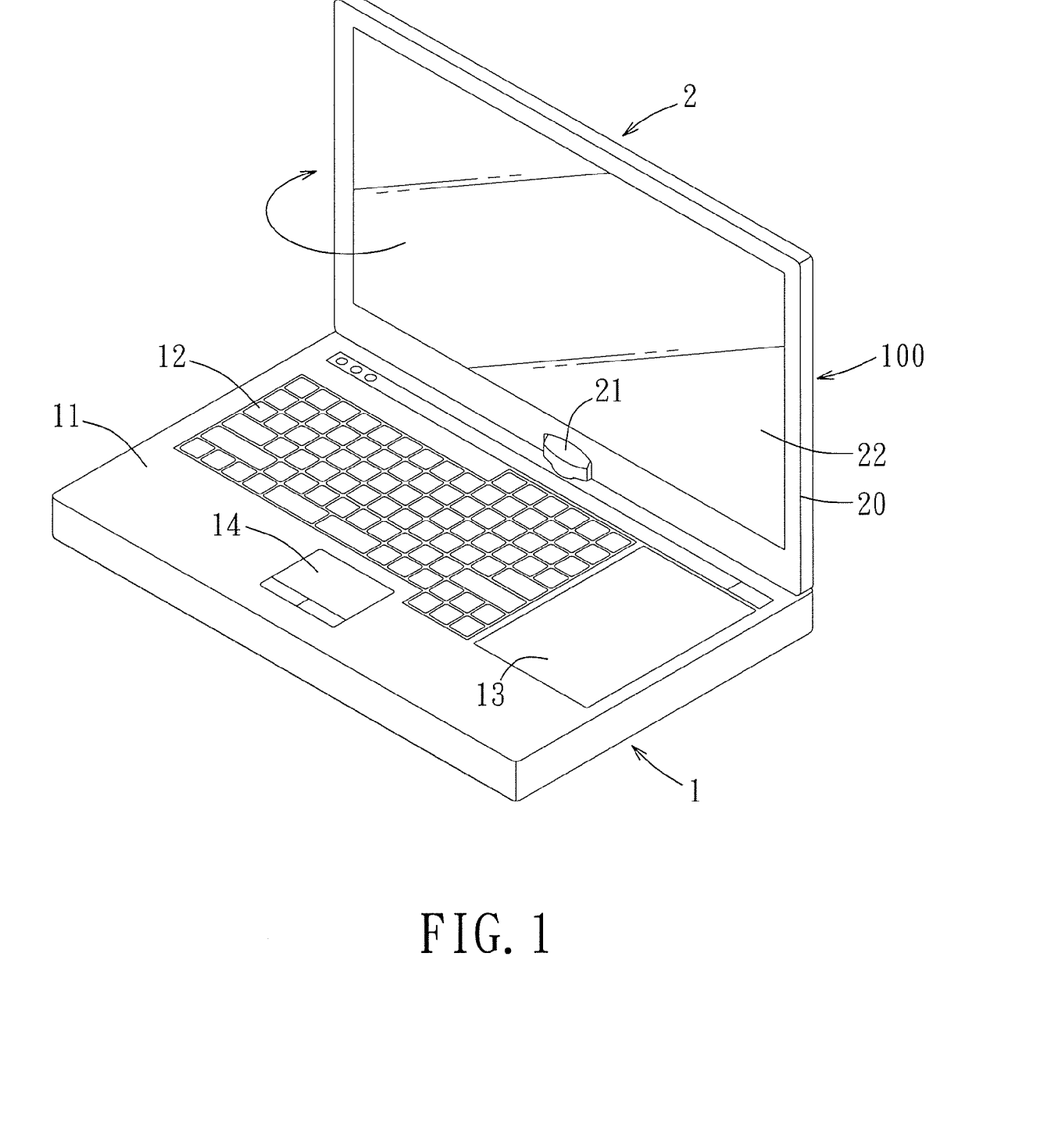
FIG. 1 is a perspective view of a preferred embodiment of a portable electronic device according to the present invention.

FIG. 1 illustrates the preferred embodiment of a portable electronic device 100 according to the present invention. In this embodiment, the portable electronic device 100 is a notebook computer.

The portable electronic device 100 includes: a computing device body 1, a display screen body 2 and a two-dimensional hinge 21.

The computing device body 1 includes a main housing 11 having an upper surface, a computing device (not shown in the Figure) disposed in the main housing 11, a keyboard 12 disposed on the upper surface of the main housing 11 and connected electrically to the computing device, a touch control display 13 disposed on the upper surface of the main housing 11 and connected electrically to the computing device, and a touchpad 14 disposed on the upper surface of the main housing 11.

The display screen body 2 includes a display housing 20, and a flat panel display 22 disposed on a side of the display housing 20 facing the computing device body 1 and connected electrically to the computing device.

Figure 2:
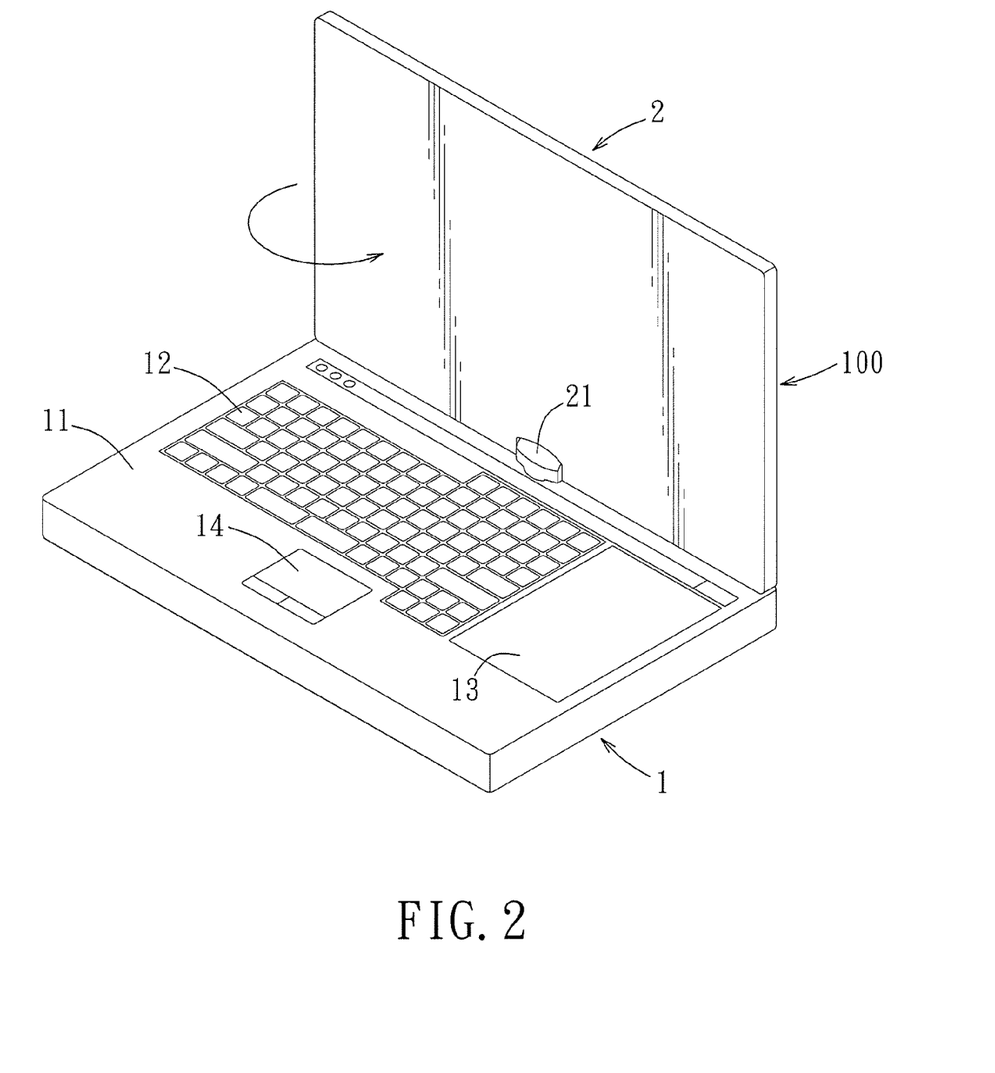
FIG. 2 is a perspective view of the preferred embodiment of the portable electronic device with a display screen body thereof pivoted so as to form a 180 degree angle with respect to a computing device body thereof.

The two-dimensional hinge 21 connects pivotally one side of the display housing 20 to one side of the main housing 11 of the computing device body 1. By virtue of the two-dimensional hinge 21, the display screen body 2 can be pivoted forward, toward the computing device body 1, to a closed position, and rearward, away from the computing device body 1, to an open position. The display screen body 2 is also pivotable leftward (or rightward) relative to the main housing 11 such that, when the display screen body 2 is pivoted 90 degrees leftward (or rightward) relative to the main housing 11, the flat panel display 22 faces a left (or right) side of the computing device body 1, and when the display screen body 2 is pivoted 180 degrees relative to the main housing 11, the flat panel display 22 faces away from the computing device body 1, as best shown in FIG. 2.

Figure 3:
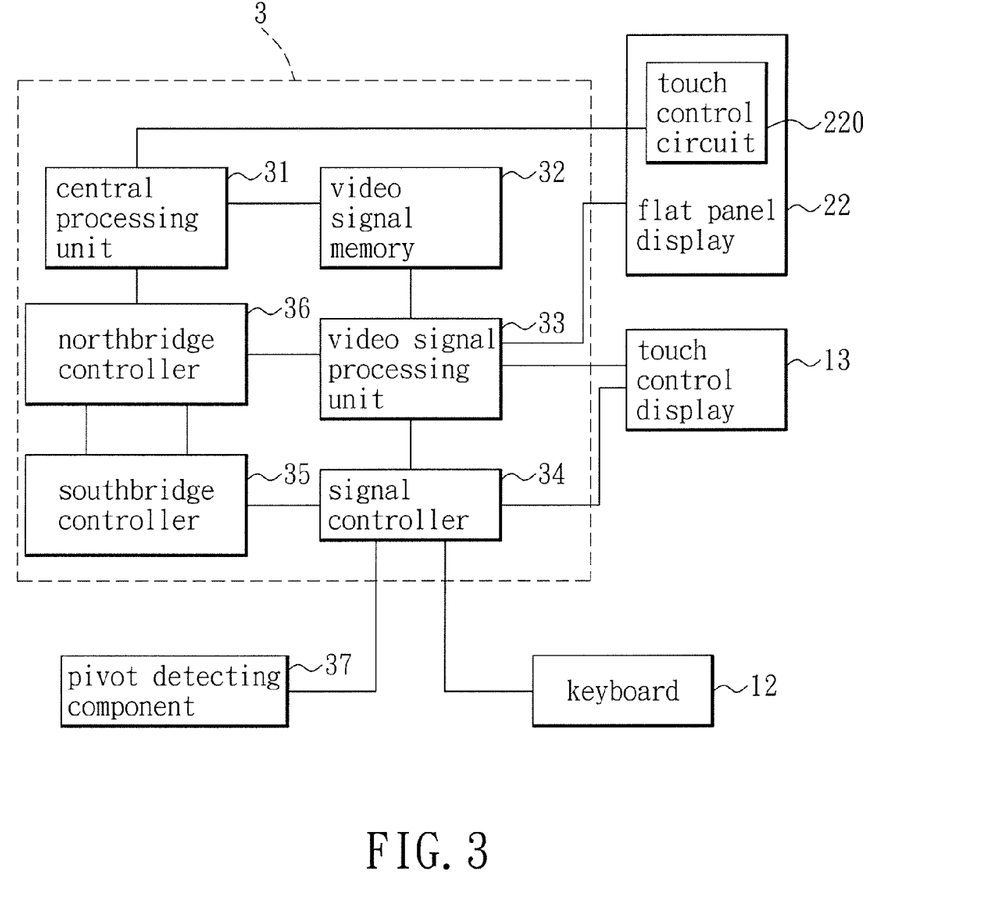
FIG. 3 is a schematic circuit block diagram of the preferred embodiment.

Referring to FIG. 3, the computing device of the portable electronic device 100 includes a motherboard 3 and a peripheral connection interface (not shown in the Figure). In this embodiment, the motherboard 3 includes a central processing unit 31, a video signal memory (VRAM) 32, a video signal processing unit (VGA) 33, a signal controller 34, and a control unit. The computing device is configured to output image signals to the touch control display 13 and the flat panel display 22, respectively, the image signals being generated based on user operation of the touch control display 13 or the keyboard 12 and being output simultaneously to the touch control display 13 and the flat panel display 22. In this embodiment, the central processing unit 31 is coupled to the video signal memory 32 for providing video signal data to the video signal memory 32 for storage in the video signal memory 32. The video signal processing unit 33 is coupled to the video signal memory 32, the touch control display 13 and the flat panel display 22 for accessing the video signal data from the video signal memory 32 and simultaneously outputting the image signals to the touch control display 13 and the flat panel display 22.

In this embodiment, the video signal data stored in the video signal memory 32 is full-screen video signal data that is provided by the central processing unit 31. The video signal processing unit 33 accesses the full-screen video signal data from the video signal memory 32 and is operable to output a same image signal to both the touch control display 13 and the flat panel display 22 based on the full-screen video signal data. Therefore, the touch control display 13 and the flat panel display 22 can display same display content simultaneously.

Therefore, when a user and a viewer need to view the display content displayed by the portable electronic device 100 simultaneously, the display screen body 2 can be turned toward the viewer so that the viewer can clearly view the display content on the flat panel display 22, and at the same time, the user can clearly view the same display content on the touch control display 13, thereby allowing the user to present the display content to the viewer effectively and conveniently.

In this embodiment, the signal controller 34 is a keyboard controller. The signal controller 34 sends keystroke signals from the keyboard 12 to the central processing unit 31 through the control unit, and generates display controls, such as brightness control, volume control, etc., corresponding to pressing of certain hot keys (which may be a single key, or a combination of several keys) preset on the keyboard 12. In this embodiment, the signal controller 34 is also connected electrically to the touch control display 13 for receiving a touch control signal from the touch control display 13.

The control unit is coupled to the signal controller 34 and the central processing unit 31 for sending the touch control and keystroke signals to the central processing unit 31 through the control unit, thus enabling the central processing unit 31 to generate the video signal data in accordance with the touch control and keystroke signals for subsequent output to the video signal memory 32. The video signal processing unit 33 can access the video signal data generated by the central processing unit 31 from the video signal memory 32, and is further operable to output the image signals to the flat panel display 22 and the touch control display 13 based on the video signal data generated by the central processing unit 31.

In this embodiment, the control unit includes: a northbridge controller 36 connected electrically to the central processing unit 31; and a southbridge controller 35 connected electrically to the northbridge controller 36 and the signal controller 34 for receiving the touch control and keystroke signals from the signal controller 34 and sending the touch control and keystroke signals to the central processing unit 31 through the northbridge controller 36.

When the user delivers a presentation to the viewer using the display content displayed by the portable electronic device 100, the user can directly perform a touch control operation on the touch control display 13, wherein the touch control display 13 can be operated in either a general input mode or a handwriting mode through pressing a hot key that is preset on the keyboard 12. In the general input mode, the user can select options, execute a function, or input a control command through a finger gesture. In the handwriting mode, the user can handwrite directly on the touch control display 13. The central processing unit 31 receives the touch control signal generated by this touch control operation performed on the touch control display 13 and generates corresponding video signal data to be stored in the video signal memory 32. The video signal processing unit 33 then accesses the video signal data from the video signal memory 32 for subsequent output of the image signals to the touch control display 13 and the flat panel display 22. Since the touch control detection technologies of the general input and handwriting modes of the touch control display 13 are well known in the art, they are not further detailed herein.

Moreover, in order to prevent undesired operation of the touch control display 13 when the user uses the keyboard 12, the keyboard 12 includes a hot key for generating a first hot key signal when pressed, the first hot key signal being transmitted to the signal controller 34 so as to cause the signal controller 34 to disable a touch control function of the touch control display 13, or to shut off the power supply to the touch control display 13. On the other hand, when the hot key is pressed again, the hot key generates a second hot key signal, the second hot key signal being transmitted to the signal controller 34 to enable the touch control function of the touch control display 13, or to provide the power supply to the touch control display 13.

Furthermore, the first and second hot key signals can be transmitted to the central processing unit 31 through the signal controller 34, the southbridge controller 35, and the northbridge controller 36 and cause the central processing unit 31 to output an enable signal or a disable signal to the signal controller 34, the signal controller 34 enabling or disabling the touch control function of the touch control display 13 in response to the enable signal and the disable signal, respectively.

In addition, in this embodiment, the flat panel display 22 has touch control functionality. In order to prevent the viewer from performing an undesired touch control operation through touching the flat panel display 22 when the flat panel display 22 is pivoted so as to face the viewer, the portable electronic device 100 further comprises a pivot detecting component 37 mounted adjacent to the two-dimensional hinge 21 and connected electrically to the signal controller 34 for detecting whether the display screen body 2 is pivoted so as to form an angle greater than a predetermined value, such as 60 degrees, relative to the main housing 11.

When the pivot detecting component 37 detects that the display screen body 2 is pivoted so as to form an angle greater than 60 degrees with respect to the main housing 11, the pivot detecting component 37 generates a first detection signal that is transmitted to the signal controller 34. The signal controller 34 then generates a touch control disable signal in accordance with the first detection signal that is transmitted to the central processing unit 31 through the southbridge controller 35 and the northbridge controller 36. The central processing unit 31 then disables a touch control function of a touch control circuit 220 of the flat panel display 22 in response to the touch control disable signal.

On the other hand, when the pivot detecting component 37 detects that the display screen body 2 is pivoted so as to form an angle less than 60 degrees with respect to the main housing 11, the pivot detecting component 37 generates a second detection signal that is transmitted to the signal controller 34. The signal controller 34 then generates a touch control enable signal in accordance with the second detection signal that is transmitted to the central processing unit 31 through the southbridge controller 35 and the northbridge controller 36. The central processing unit 31 then enables the touch control function of the touch control circuit 220 of the flat panel display 22 in response to the touch control enable signal.

It is worth noting that a hot key can be configured so as to provide control for enabling and disabling the touch control functionality of the flat panel display 22 in other embodiments of the invention.

In this embodiment, the touch control display 13 can use conventional touch control detection technology for performing an appropriate scaling process on content displayed on the flat panel display 22 based on the touch control operations performed on the touch control display 13.

For instance, when the flat panel display 22 and the touch control display 13 display same web page content, the user can perform two touch control operations on the touch control display 13 involving changing a way in which the user's fingers contact the touch control display 13 so as to control upscaling and downscaling of the web page content displayed on the flat panel display 22, respectively. Each of the touch control operations generates a corresponding touch control signal that is transmitted to the central processing unit 31 through the signal controller 34, the southbridge controller 35 and the northbridge controller 36. The central processing unit 31 then determines whether the touch control signal corresponds to an upscaling command or a downscaling command in order to realize an appropriate upscaling or downscaling process through a hardware driver or software, as explained in detail below.

1) The display content can be scaled using the video signal processing unit 33, that is, using a hardware driver resident in the video signal processing unit 33. Under normal display conditions, the video signal processing unit 33 accesses the full-screen video signal data from the video signal memory 32 and outputs a same image signal based on the full-screen video signal data to both the flat panel display 22 and the touch control display 13 simultaneously. However, when the video signal processing unit 33 receives a scaling control command from the central processing unit 31, which is one of a downscaling command and an upscaling command, the video signal processing unit 33 performs the appropriate scaling process on the full-screen video signal data in accordance with the scaling control command to produce scaled video signal data, and outputs an image signal corresponding to the full-screen video signal data to the touch control display 13 and another image signal corresponding to the scaled video signal data to the flat panel display 22.

In the following examples of the upscaling and downscaling processes performed through the video signal processing unit 33, as well as in examples of those processes performed through the central processing unit 31 that are to follow, it is assumed that both the flat panel display 22 and the touch control display 13 have resolutions of 1024×768, that is, a display area of 1024×768, and that the full-screen video signal data stored in the video signal memory 32 is accordingly video signal data having a resolution of 1024×768.

Figure 4:
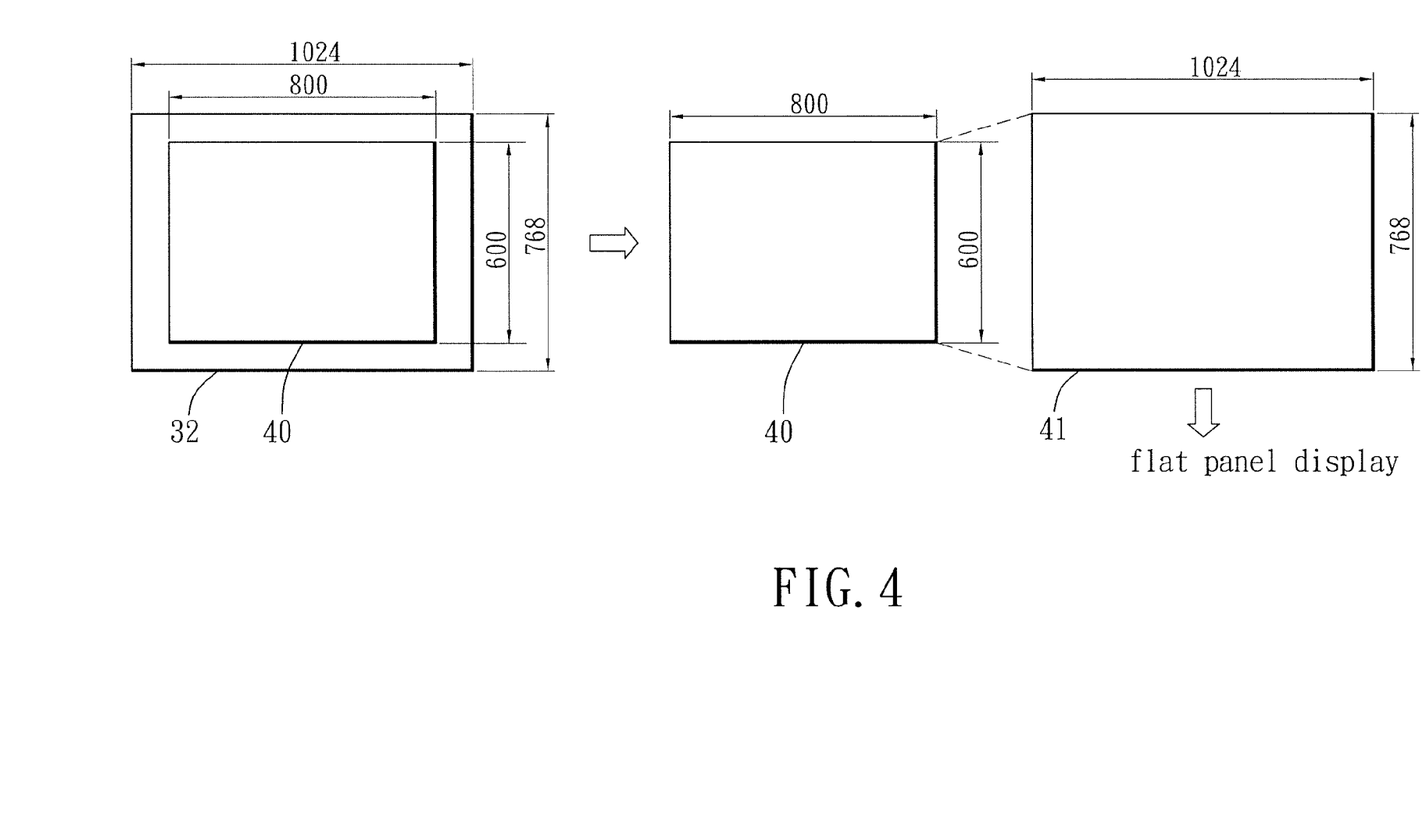
FIG. 4 is a schematic diagram of an upscaling process performed by a video signal processing unit of the preferred embodiment.

Referring to FIG. 4, when the video signal processing unit 33 receives the upscaling command from the central processing unit 31, a graphic processing unit (GPU, not shown in the Figure) of the video signal processing unit 33 accesses a portion of the full-screen video signal data 40 corresponding to a central area of the display content, such as video signal data having a resolution of 800×600, and performs an upscaling process on this portion of the full-screen video signal data 40 so as to produce an upscaled video signal data 41 that is capable of filling the entire display area of the flat panel display 22, which in this case is video signal data having a resolution of 1024×768. Therefore, when the image signal corresponding to the upscaled video signal data 41 is output to the flat panel display 22, the flat panel display 22 displays an upscaled image of the central area of original display content.

Figure 5:
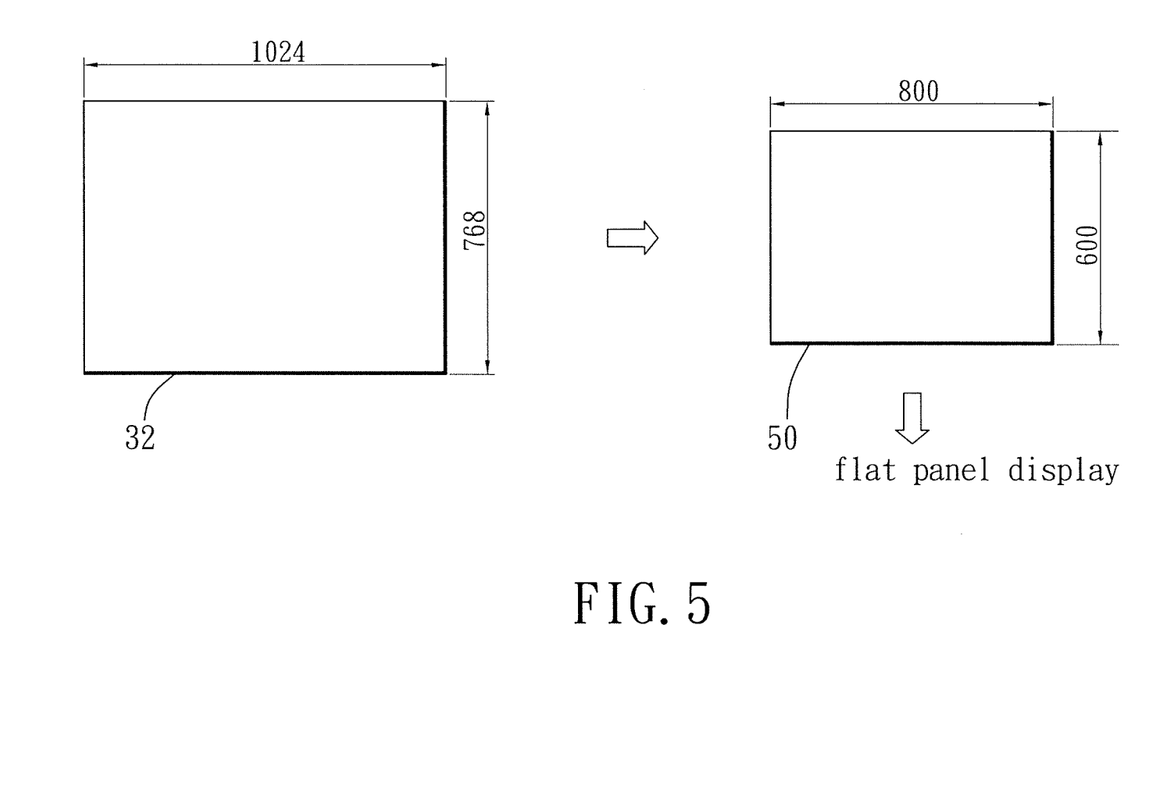
FIG. 5 is a schematic diagram of a downscaling process performed by the video signal processing unit of the preferred embodiment.

Referring to FIG. 5, when the video signal processing unit 33 receives the downscaling command from the central processing unit 31, and the original display content is to be downscaled so as to occupy only the central area of the display area, such as a central area having a resolution of 800×600, the GPU of the video signal processing unit 33 accesses at intervals the full-screen video signal data stored in the video signal memory 32 so as to produce a downscaled video signal data 50 having a resolution of 800×600. The video signal processing unit 33 subsequently outputs an image signal corresponding the downscaled video signal data 50 to the central area of the display area of the flat panel display 22, and renders a remaining area of the display area either black or white. The original display content having a resolution of 1024×768 is thus downscaled to display content having a resolution of 800×600 for display on the flat panel display 22.

Figure 6:
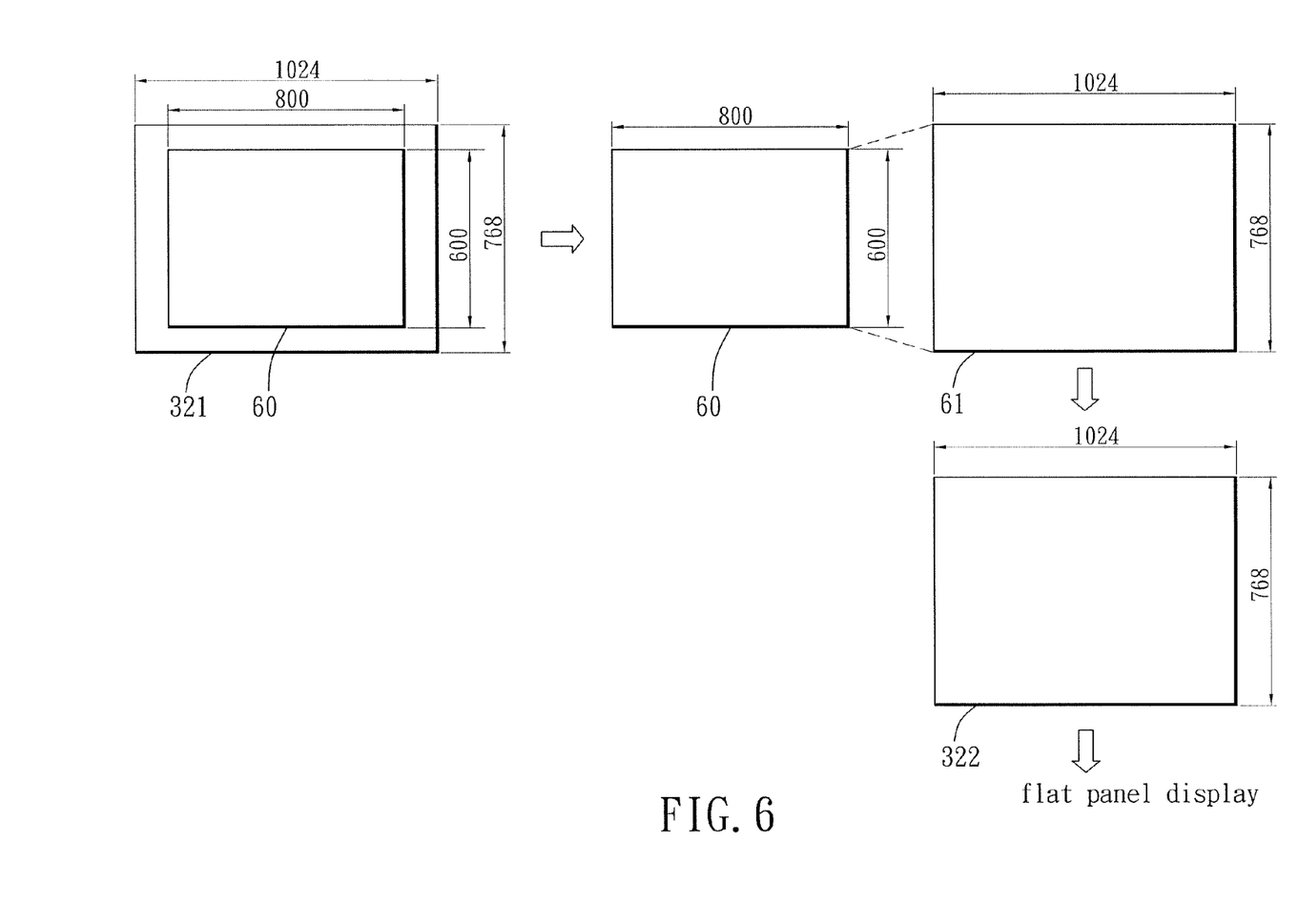
FIG. 6 is a schematic diagram of an upscaling process performed by a central processing unit of the preferred embodiment through a software driver.

2) Similarly, the central processing unit 31 can be configured through software to scale the display content. To scale the display content in this manner, the video signal memory 32 requires inclusion of a first memory area 321 for storing the full-screen video signal data, which is in this case the video signal data having a resolution of 1024×768, and a second memory area 322 for storing the scaled video signal data, as shown in FIG. 6.

Under normal display conditions, the video signal processing unit 33 accesses the full-screen video signal data stored in the first memory area 321 and outputs the same image signal to both the touch control display 13 and the flat panel display 22 simultaneously. However, when the central processing unit 31 receives a scaling control command, the central processing unit 31 accesses the full-screen video signal data from the first memory area 321, performs an appropriate scaling process on the full-screen video signal data to produce the scaled video signal data, stores the scaled video signal data in the second memory area 322, and instructs the video signal processing unit 33 to access the full-screen video signal data from the first memory area 321 in order to output an image signal corresponding to the full-screen video signal data to the touch control display 13, and to access the scaled video signal data from the second memory area 322 in order to output another image signal corresponding to the scaled video signal data to the flat panel display 22.

For instance, when the central processing unit 31 receives the upscaling command, the central processing unit 31 accesses a portion of the full-screen video signal data 60 corresponding to the central area of the display content, such as video signal data having a resolution of 800×600, and upscales this portion of the full-screen video signal data 60 to produce upscaled video signal data 61 having a resolution of 1024×768 for subsequent storage in the second memory area 322. The central processing unit 31 then instructs the video signal processing unit 33 to access the upscaled video signal data from the second memory area 322 in order to output a corresponding image signal to the flat panel display 22, so that the flat display 22 displays an upscaled image of the central area of the original display content.

Figure 7:
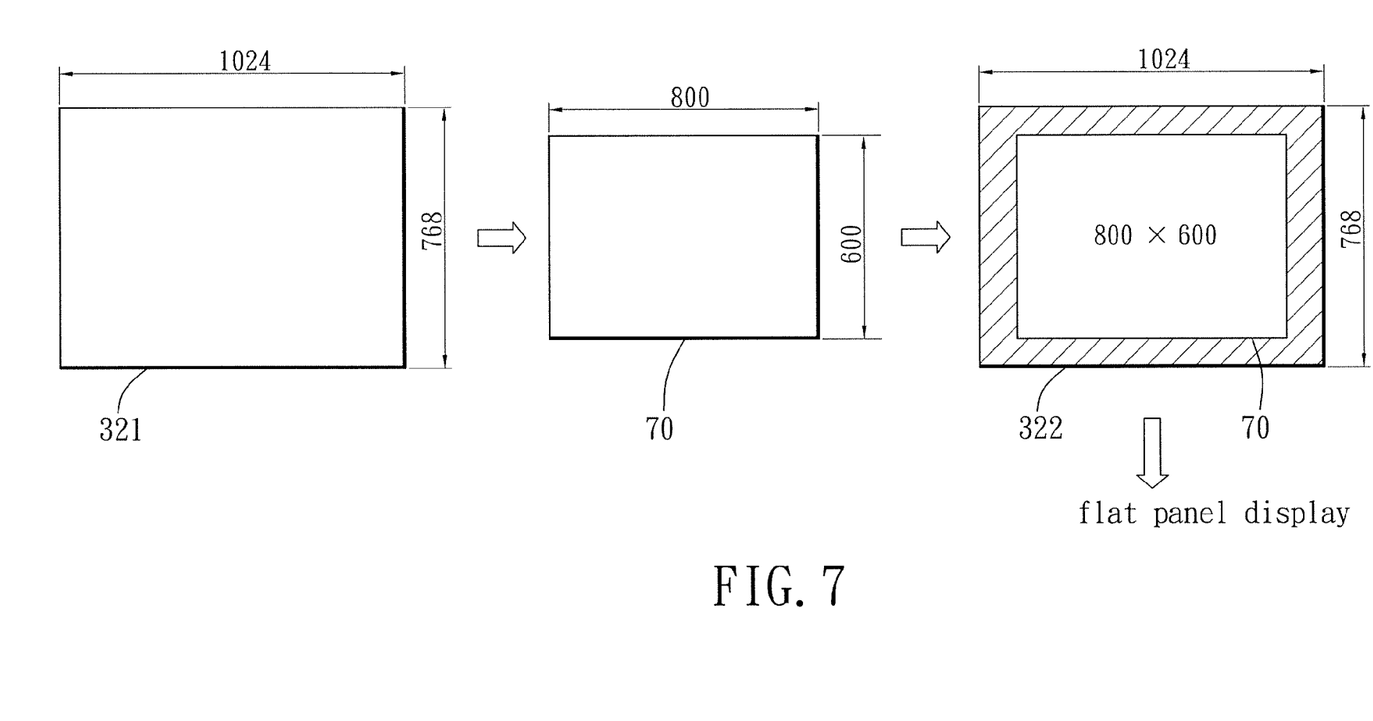
FIG. 7 is a schematic diagram of a downscaling process performed by the central processing unit of the preferred embodiment through the software driver.

Referring to FIG. 7, when the central processing unit 31 receives the downscaling command, the central processing unit 31 is configured through software to access at intervals the full-screen video signal data stored in the video signal memory 32 so as to produce downscaled video signal data 70, such as video signal data having a resolution of 800×600, for subsequent storage in the second memory area 322, and fills the rest of the second memory area 322 with zeroes. The central processing unit 31 then instructs the video signal processing unit 33 to access the downscaled video signal data 70 from the second memory area 322 in order to output a corresponding image signal to the flat panel display 22, such that the central area of the display area of the flat panel display 22 displays a downscaled image having a resolution of 800× 600.

From the foregoing, it should be noted that the image signals sent to the touch control display 13 are based on the full-screen video signal data accessed from the video signal memory 32 or the first memory area 321 of the video signal memory 32, and therefore, the touch control display 13 always displays an unscaled version of the display content so that the user can perform touch control operations on the touch control display 13.

It should also be noted that the upscaling and downscaling commands can correspond to two hot key signals generated by two hot keys of the keyboard 12, respectively, and that these hot key signals, like the touch control signals, can be sent to the central processing unit 31 through the signal controller 34, the southbridge controller 35 and the northbridge controller 36.

In sum, the portable electronic device 100 of the present invention implements a touch control display 13 adjacent to the keyboard 12 of the computing device body 1, and a two-dimensional hinge 21 connecting pivotally the display housing 20 to one side of the main housing 11 of the computing device body 1 that allows the display screen body 2 to pivot relative to the computing device body 1. When the display screen body 2 is pivoted such that the flat panel display 22 faces away from the user toward the viewer, the user can still view the content displayed on the flat panel display 22 through the touch control display 13 on the computing device body 1, and can perform touch control operations through the touch control display 13. Moreover, through operation of the touch control display 13 and the hot keys of the keyboard 12, the scaling control command can be issued to the computing device for performing an appropriate scaling process on the display content displayed on the flat panel display 22. The present invention thus provides flexibility and convenience with respect to performing input operations and displaying images to the viewer.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable electronic device comprising:
a computing device body including
a main housing having an upper surface,
a computing device disposed in said main housing,
a keyboard disposed on said upper surface of said main housing and connected electrically to said computing device, and
a touch control display disposed on said upper surface of said main housing and connected electrically to said computing device;
a display screen body including
a display housing, and
a flat panel display disposed on a side of said display housing and connected electrically to said computing device; and
a two-dimensional hinge connecting pivotally said display housing to one side of said main housing such that said display screen body is pivotable forward, rearward, leftward, and rightward relative to said main housing;
wherein said computing device is configured to output image signals to said touch control display and said flat panel display, respectively, the image signals being generated based on user operation of at least one of said touch control display and said keyboard and being output simultaneously to said touch control display and said flat panel display;
wherein said computing device includes:
a video signal memory;
a central processing unit coupled to said video signal memory for providing video signal data to said video signal memory for storage in said video signal memory;
a video signal processing unit coupled to said video signal memory, said touch control display and said flat panel display for accessing said video signal data from said video signal memory and outputting the image signals to said touch control display and said flat panel display;
a signal controller connected electrically to said touch control display for receiving a touch control signal from said touch control display;
a control unit coupled to said signal controller and said central processing unit for sending the touch control signal to said central processing unit, thus enabling said central processing unit to generate said video signal data in accordance with the touch control signal for subsequent output to said video signal memory;
wherein said control unit includes:
a northbridge controller connected electrically to said central processing unit; and
a southbridge controller connected electrically to said northbridge controller and said signal controller for receiving the touch control signal from said signal controller and sending the touch control signal to said central processing unit through said northbridge controller;
wherein said keyboard includes a hot key that,
when pressed, generates a first hot key signal that is transmitted to said central processing unit through said signal controller, said southbridge controller, and said northbridge controller and that causes said central processing unit to output a disable signal to said signal controller, said signal controller disabling a touch control function of said touch control display in response to said disable signal, and
when pressed again, generates a second hot key signal that is transmitted to said central processing unit through said signal controller, said southbridge controller, and said norhtbridge controller and that causes said central processing unit to output an enable signal to said signal controller, said signal controller enabling the touch control function of said touch control display in response to said enable signal.

2. The portable electronic device as claimed in claim 1, wherein said signal controller is a keyboard controller.

3. The portable electronic device as claimed in claim 1, wherein said signal controller is a keyboard controller.

4. The portable electronic device as claimed in claim 1, wherein said flat panel display has touch control functionality, and said portable electronic device further comprises a pivot detecting component connected electrically to said signal controller for generating a detection signal that is transmitted to said central processing unit when said pivot detecting component detects that said display screen body is pivoted so as to form an angle greater than a predetermined value with respect to said main housing, said central processing unit disabling the touch control functionality of said flat panel display in response to said detection signal.

5. The portable electronic device as claimed in claim 1, wherein said video signal memory stores full-screen video signal data therein, said video signal processing unit accessing said full-screen video signal data from said video signal memory and being operable to output a same image signal to both said touch control display and said flat panel display based on said full-screen video signal data.

6. The portable electronic device as claimed in claim 5, wherein, when said video signal processing unit receives a scaling control command from said central processing unit, said video signal processing unit performs an appropriate scaling process on said full-screen video signal data according to said scaling control command to produce scaled video signal data, and outputs an image signal corresponding to said full-screen video signal data to said touch control display and another image signal corresponding to said scaled video signal data to said flat panel display.

7. The portable electronic device as claimed in claim 6, wherein said scaling control command is one of a downscaling command and an upscaling command, said downscaling and upscaling commands corresponding to two touch control signals from said touch control display, respectively.

8. The portable electronic device as claimed in claim 6, wherein said scaling control command is one of a downscaling command and an upscaling command, said downscaling and upscaling commands corresponding to two hot key signals generated by two hot keys of said keyboard, respectively.

9. The portable electronic device as claimed in claim 5, wherein said video signal memory includes:
- a first memory area for storing said full-screen video signal data; and
- a second memory area for storing scaled video signal data that is generated by said central processing unit when said central processing unit receives a scaling control command;
- wherein, in accordance with said scaling control command, said central processing unit accesses said full-screen video signal data from said first memory area, performs an appropriate scaling process on said full-screen video signal data to produce said scaled video signal data, and instructs said video signal processing unit to
  - access said full-screen video signal data from said first memory area and output an image signal corresponding to said full-screen video signal data to said touch control display, and
  - access said scaled video signal data from said second memory area and output another image signal corresponding to said scaled video signal data to said flat panel display.

10. The portable electronic device as claimed in claim 9, wherein said scaling control command is one of a downscaling command and an upscaling command, said downscaling and upscaling commands corresponding to two touch control signals from said touch control display, respectively.

11. The portable electronic device as claimed in claim 9, wherein said scaling control command is one of a downscaling command and an upscaling command, said downscaling and upscaling commands corresponding to two hot key signals generated by two hot keys of said keyboard, respectively.

\* \* \* \* \*